(12) United States Patent
Esaka

(10) Patent No.: US 7,158,775 B1
(45) Date of Patent: Jan. 2, 2007

(54) MOBILE COMMUNICATION SYSTEM

(75) Inventor: Satoshi Esaka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 09/723,161

(22) Filed: Nov. 27, 2000

(30) Foreign Application Priority Data

Jun. 20, 2000 (JP) ............................. 2000-184699

(51) Int. Cl.
*H04M 11/00* (2006.01)

(52) U.S. Cl. .................. 455/406; 455/435.1; 455/456.1

(58) Field of Classification Search ................ 455/405, 455/411, 432.1, 406, 466, 435.1, 456.1
See application file for complete search history.

(56) References Cited

U.S. PATENT DOCUMENTS

| 5,706,031 A | * | 1/1998 | Brendzel et al. |
| 5,706,330 A | * | 1/1998 | Bufferd et al. |
| 6,496,689 B1 | * | 12/2002 | Keller et al. |

FOREIGN PATENT DOCUMENTS

| JP | 09-081811 | 3/1997 |
| JP | 09-097358 | 4/1997 |
| JP | 09-116960 | 5/1997 |

* cited by examiner

*Primary Examiner*—Joseph Feild
*Assistant Examiner*—Huy D. Nguyen
(74) *Attorney, Agent, or Firm*—Katten Muchin Rosenman LLP (57) ABSTRACT

In a mobile communication system holding accounting information of a mobile terminal in a database of a mobile exchange, a mobile terminal controller is provided in an offerer of pay facilities, for transmitting dummy or random location information to the mobile terminal, for connecting a call to the mobile exchanges to provide the mobile exchange with user information when the mobile terminal transmits a location registration demand message with the user information in response to the location information, and for providing the mobile exchange with accounting information of facilities rate in response to a retrieval when the mobile exchange retrieves the user information in the database.

17 Claims, 11 Drawing Sheets

| ADDRESS | | USER DATA | | | | | | ADDITIONAL INFORMATION (USER INFORMATION ACQUIRED FROM HLR) | | |
|---|---|---|---|---|---|---|---|---|---|---|
| UPPER ADDRESS (CORRESPONDING TO SUBSCRIBER INFORMATION) | LOWER ADDRESS (CORRESPONDING TO MAXIMUM USE FREQUENCY THRESHOLD VALUE) | START TIME | FINISH TIME | PLACE/ENTRANCE | EXIT | NUMBER OF USERS | FACILITIES RATE | ADDRESS | NAME | OTHERS |
| USER A1 - SUBSCRIBER INFORMATION | | 9:53 | 11:35 | BILLIARDS | — | 4 | 3200 | ○○○ | ×׿ | ▢▢▢ |
| | | 13:05 | — | VENDING MACHINE Y | — | 2 | 240 | | | |
| | | 19:30 | — | GO-CART | — | 2 | 1400 | | | |
| USER A2 - SUBSCRIBER INFORMATION | | 9:55 | 9:55 | VENDING MACHINE X | — | — | 120 | | | |
| --- | --- | --- | --- | --- | --- | --- | --- | --- | --- | --- |
| USER An - SUBSCRIBER INFORMATION | | 14:17 | — | VENDING MACHINE W | — | 2 | 270 | △△ | ★★★ | ▢▢▢ |
| | | 16:32 | 17:52 | ×○ INTERCHANGE | ○△ INTERCHANGE | — | 1600 | | | |

| ADDRESS | DATA |
|---|---|
| MOBILE TERMINAL SUBSCRIBER (NOT INCLUDING FACILITIES OFFERER) | CALL RATE |
| INDIVIDUAL 1 | |
| INDIVIDUAL 2 | |
| INDIVIDUAL 3 | |
| INDIVIDUAL 4 | |
| INDIVIDUAL 5 | |
| ⋮ | ⋮ |
| INDIVIDUAL n-1 | |
| INDIVIDUAL n | |

| ADDRESS | DATA | | | PASSWORD |
|---|---|---|---|---|
| MOBILE TERMINAL SUBSCRIBER (INCLUDING FACILITIES OFFERER) | ADDITIONAL USER INFORMATION | | | |
| | ADDRESS | NAME | OTHERS | |
| INDIVIDUAL 1 | | | | |
| INDIVIDUAL 2 | | | | |
| INDIVIDUAL 3 | | | | |
| INDIVIDUAL 4 | | | | |
| INDIVIDUAL 5 | | | | |
| ⋮ | ⋮ | ⋮ | ⋮ | ⋮ |
| FACILITIES OFFERER A | | | | |
| FACILITIES OFFERER B | | | | |
| INDIVIDUAL n-1 | | | | |
| FACILITIES OFFERER C | | | | |
| INDIVIDUAL n | | | | |

| ADDRESS | PAYMENT INFORMATION TO MOBILE COMMUNICATION COMPANY | | | USER DATA | MOBILE COMMUNICATION COMPANY → PAYMENT INFORMATION TO FACILITIES OFFERER | | | |
|---|---|---|---|---|---|---|---|---|
| MOBILE TERMINAL SUBSCRIBER (INCLUDING FACILITIES OFFERER) | FACILITIES OFFERER IDENTIFICATION DATA | DATE | RATE | USER | FACILITIES CLASSIFICATION | RATE | COMISSION | PAYMENT AMOUNT |
| INDIVIDUAL 1 | a - CAMPSITE<br>u - TOLL OF EXPRESSWAY<br>e - FURNITURES<br>a - VENDING MACHINE A | ○.×.×<br>×.×.×<br>○.○<br>×.○ | 3000<br>2000<br>90000<br>100 | | | | | |
| ----- | ----- | ----- | ----- | ----- | ----- | ----- | ----- | ----- |
| FACILITIES OFFERER a | | | α<br>β<br>Ω | INDIVIDUAL 1<br>INDIVIDUAL 1<br>INDIVIDUAL n-1 | CAMPSITE<br>VENDING MACHINE "A"<br>MOVIE THEATER | 3000 | α<br>β<br>Ω | 3000 - α<br>100 - β<br>1000 - Ω |
| FACILITIES OFFERER ka | | | γ | | | | | |
| INDIVIDUAL n-1 | a - MOVIE THEATER | △.△ | 1000 | | | | | |
| FACILITIES OFFERER ki | | | κ | | | | | |
| INDIVIDUAL n | | | | | | | | |

MOBILE COMMUNICATION SYSTEM

BACKGROUND OF THE INVENTION

1. Field of the Invention

The present invention relates to a mobile communication system, and in particular to a mobile communication system comprising a mobile terminal and a mobile exchange, and holding accounting information of the mobile terminal in a database of the mobile exchange.

For using pay facilities (charged facilities) such as a vending machine, expressway, and movie theater, a system has been required which carries out cashless payments by a facilities user and a pay facilities offerer (hereinafter simply referred to as facilities offerer) with a mobile terminal.

2. Description of the Related Art

As a system for carrying out cashless payments by a facilities user and a facilities offerer with a mobile terminal as mentioned above, the following prior art has been proposed:

(1) Japanese Patent Application Laid-open No. 9-116960

A cashless system is disclosed comprising a portable apparatus which can transmit ID information of a user, a financial organization having accounting information corresponding to the ID information, and a public communication network which accommodates the portable apparatus and the financial organization; the user calls the financial organization with the portable apparatus and transmits information relating to transactions after connecting the call; and the financial organization processes receiving/paying money between accounts respectively corresponding to the ID information of the user and the information relating to the transactions.

(2) Japanese Patent Application Laid-open No. 9-81811

An entrance/exit management system is disclosed in which a mobile terminal has a terminal ID, a data medium of accounting information, and a transceiver operating between terminals at an entrance; and information is again transmitted/received between the terminals at an exit to clear off the rate.

(3) Japanese Patent Application Laid-open No. 9-97358

A cashless system is disclosed in which a call is connected between a mobile terminal and a host exchange, so that accounting data are calculated and accumulated at the host exchange.

In the above-mentioned prior art (1), a complicated manual operation by a mobile terminal owner such as instructions according to a guidance between the mobile terminal owner and the financial organization is required for the call connection, which leads to a call rate being accounted. Also, it is necessary for the financial organization to newly have a database for specifying a user.

Also in the above-mentioned priori art (2), a complicated call connection is required, and the mobile terminal is further required to have a storing function of the accounting information and a controlling function between receiving terminals.

Furthermore in the prior art (3), the call has to be connected between the mobile terminal and the host exchange, and the accounting information can not be monitored at facilities side.

SUMMARY OF THE INVENTION

It is accordingly an object of the present invention to provide a mobile communication system which holds accounting information of a mobile terminal in a database of a mobile exchange wherein a facilities offerer can perform, without a call connection, an accounting process of user information of the mobile terminal carried by a user of pay facilities.

In order to achieve the above-mentioned object, a mobile communication system according to the present invention of claim 1 comprises a mobile terminal controller, provided in an offerer of pay facilities, for transmitting dummy or random location information to a mobile terminal carried by a user of the pay facilities, for connecting a call to a mobile exchange to provide the mobile exchange with user information when the mobile terminal transmits a location registration demand message with the user information in response to the location information, for notifying the mobile terminal of the user information when the mobile exchange retrieves the user information in the database, and for providing the database with accounting information of a facilities rate (charge for using facilities).

The operation of the present invention will now be described by the principle sequence diagram shown in FIG. 1.

When a user "A" of a mobile terminal 1 firstly enters into a facilities offerer "B", a light source such as infrared ray is interrupted by a facilities user "A" (at steps S1 and S2). As a result, dummy or random location information is transmitted to the mobile terminal 1 (at step S3). This location information may be always transmitted.

As a result, the location information, to which a location registration has been already performed, disagrees with the dummy or random location information at the mobile terminal 1 (at step S4), so that a location registration demand message, with user (subscriber) information, is transmitted to a mobile terminal controller 2 (at step S5). When the user information is received, the transmission of the location information to the mobile terminal 1 is suspended (at step S6).

The mobile terminal controller 2 calls a mobile exchange "C" having an area where the facilities offerer "B" is located (at step S7) to establish a communication path (at step S8).

When the mobile terminal controller 2 transmits the user information to the mobile exchange "C", the mobile exchange "C" determines whether or not a home location register, that is a database of its own, holds the user information (at step S10). When it is found that the user information is held in its own exchange, the user information is notified to the mobile terminal controller 2 (at step S14).

The mobile terminal controller 2 displays the rate or the like at the facilities offerer "B" together with the user information (at step S15). The facilities user "A" who watches the display, or the facilities user "B" requested by the facilities user "A" confirms the display contents (at step S16), thereby demanding accounting the facilities rate or the like to HLR 8 of the mobile exchange "C".

It is to be noted that the accounting confirmation means may have display means of the user information and the facilities rate, and confirmation means for enabling the facilities user "A" or the facilities offerer "B" to confirm display contents by the display means. Also, the confirmation means may include password inputting means and means for comparing and checking the password with a password included in the database.

Thus, the mobile terminal 1 can automatically accumulate the pay facilities rate as the accounting information in the database of the mobile exchange "C" without connecting a call to the mobile terminal controller 2 and the exchange "C".

On the other hand, when it is found that the user information sent from the mobile terminal controller 2 does not exist in the database of the mobile exchange "C", the mobile exchange "C" retrieves the user information from other mobile exchanges.

In this case, each mobile exchange has another database (GLR 9) storing which mobile exchange's database holds which user information. By referring to this, a user information retrieval demand (at step S19) is performed to the database (HLR 8) of a mobile exchange "D" to which the facilities user "A" subscribes based on the database (GLR 9) (at step S12).

As a result, the user information exists in the database of the mobile exchange "D", so that the user information is notified to the mobile terminal controller 2 through the mobile exchange "C" (at steps S13 and S14). Hereafter, the user information and the accounting information will be confirmed in the same way as the above.

It is to be noted that the mobile exchange "D" which has received an accounting demand of the facilities rate or the like can notify the facilities user "A" of the mobile terminal 1 of an estimated account amount through the mobile terminal controller 2 (at steps S19–S22). As a result, when the notification is confirmed by the facilities user "A" or the facilities offerer "B", accounting instructions of the facilities rate or the like are given to the database of the mobile exchange "D" in the same way as the above steps S17 and S18 (at steps S23 and S24).

It is to be noted that the database of the mobile exchange may have, as the accounting information, the facilities rate of the facilities user "A" and the facilities rate from which service offering rate of a mobile exchange having an area where the mobile terminal controller 2 is located is subtracted.

Furthermore, the database of the above-mentioned user information and the facilities rate are accumulated in the HLR 8, which is the database of each mobile exchange. However, if similar accounting information or the like is stored in a user information accumulator 4 by providing the user information accumulator in the mobile terminal controller 2, it becomes possible to more accurately perform the accounting process by checking both of the databases and to apply the accounting information or the like to other various data process.

Furthermore, if the mobile terminal controller 2 is provided in each of a plurality of facilities offerers, a single mobile terminal controller is made a host with the other mobile terminal controllers being made clients, and information necessary for the accounting process is gathered in the host to be transferred to the corresponding mobile exchange, an accounting based on a distance between accounting places on the expressway or the like, and an accounting based on a time difference between the facilities (i.e. difference between an entrance time and an exit time) can be carried out.

BRIEF DESCRIPTION OF THE DRAWINGS

Throughout the figures, like reference numerals indicate like or corresponding components.

DESCRIPTION OF THE EMBODIMENTS

Figure 2:
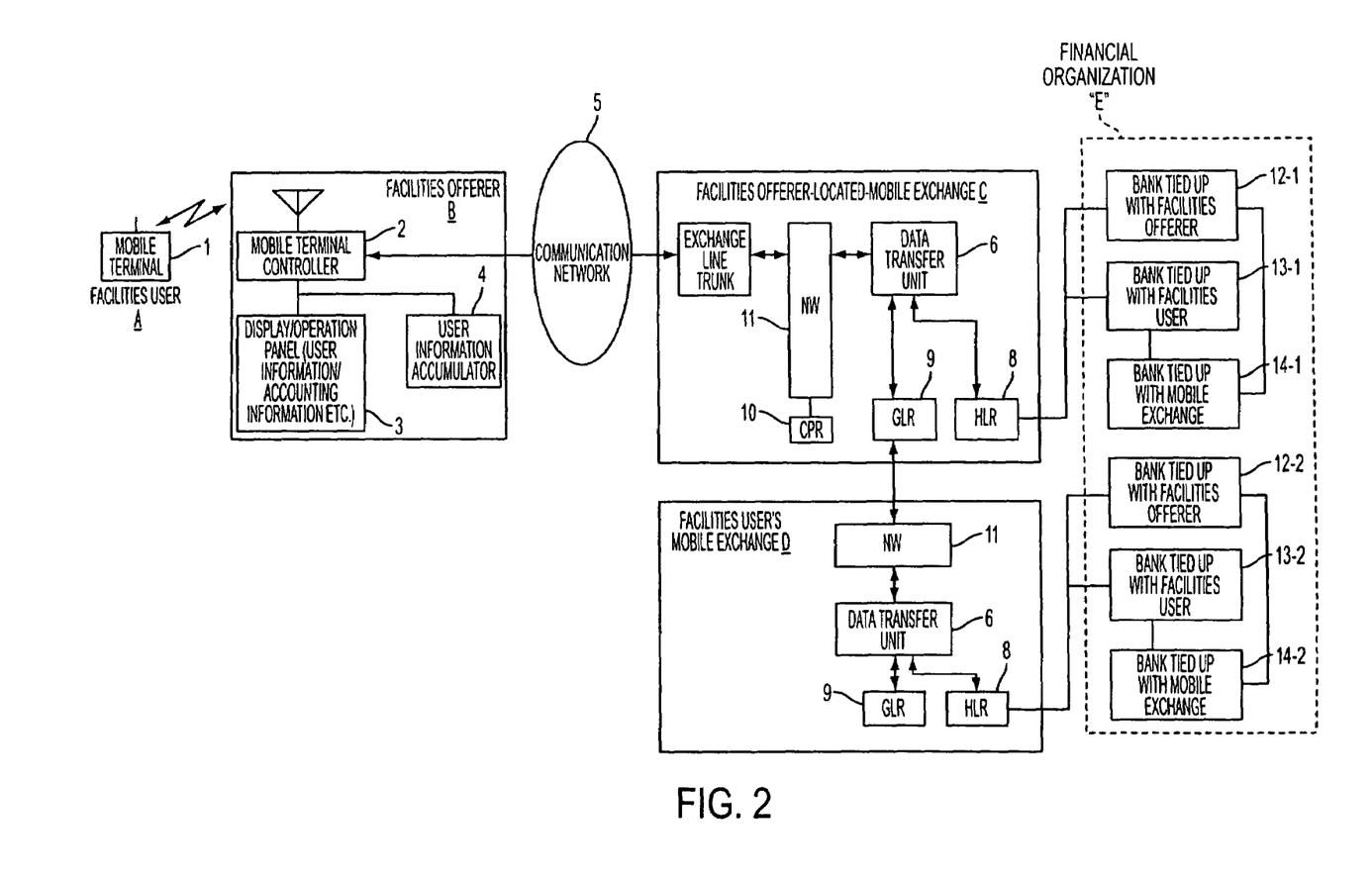
FIG. 2 is a block diagram showing an embodiment (1) of a mobile communication system according to the present invention.

FIG. 2 shows an embodiment of a mobile communication system (in case that a pay facilities offerer has a single facilities unit) according to the present invention. Hereinafter, the arrangement, the function, and the sequence of the mobile communication system will be described referring to the diagrams in the order of reference numerals.

The reference numeral 1 in FIG. 2 denotes a mobile terminal, carried by a facilities user "A", which may be an existing mobile terminal such as a PHS and portable telephone (PDC, CDMA method, etc.). As is generally known, mobile terminal (roamer) information, user (subscriber) information, location information, and the like are stored in a storage medium such as an SIM of the mobile terminal 1.

The reference numeral 2 denotes a mobile terminal controller, provided in a facilities offerer "B", which has a read demand function of the user information and the mobile terminal information for the mobile terminal 1 of the facilities user "A", a transmitting/receiving function of information for a mobile exchange, and a connection function with outside peripherals such as a display/operation panel 3 for user information/accounting information, etc. and a user information accumulator 4.

Figure 3:
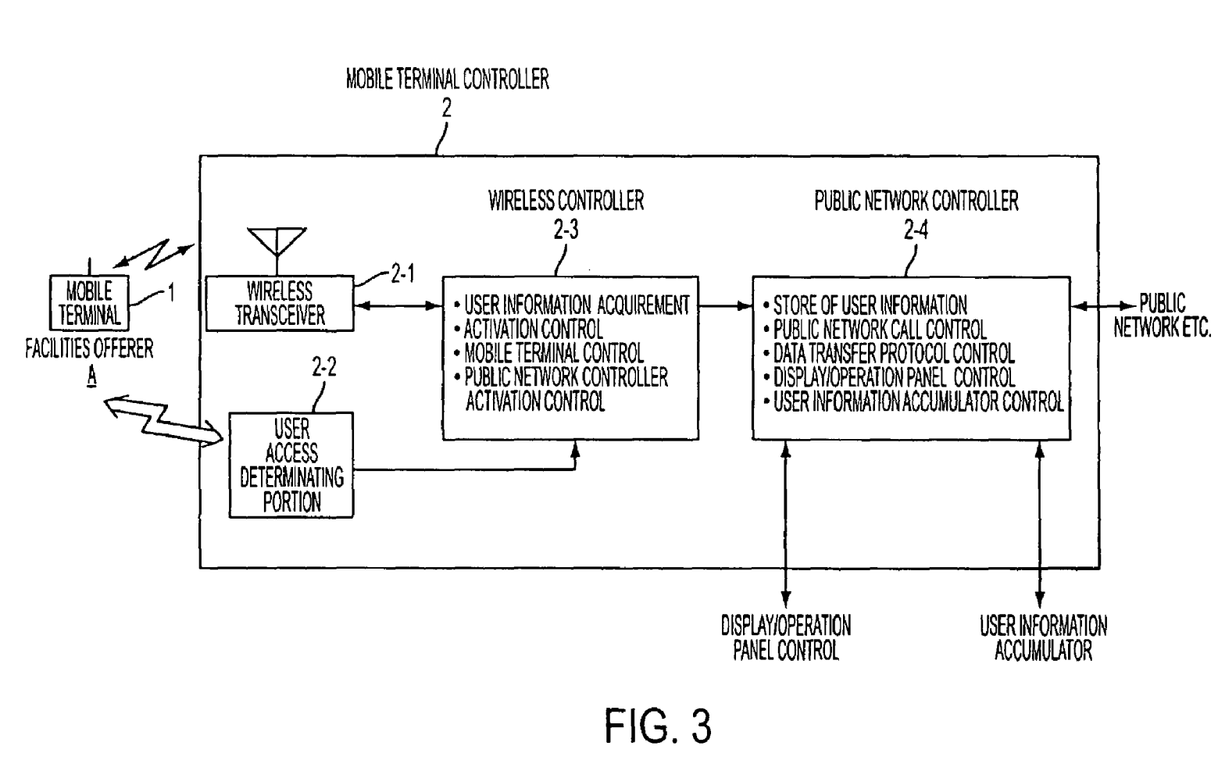
FIG. 3 is a block diagram showing an embodiment of a mobile terminal controller in the facilities offerer "B" shown in FIG. 2.

An embodiment of the mobile terminal controller 2 is shown in FIG. 3, where a reference numeral 2-1 denotes a wireless transceiver which converts a wireless signal used in the mobile terminal 1 into an electrical signal. A reference numeral 2-2 denotes a user access determinating portion, which is arranged with a circuit which detects an interruption of a light source such as infrared ray in this embodiment. By detecting the interruption that the light is interrupted by the user "A" (at step S1 of FIG. 1), the presence/absence of an access from the mobile terminal 1 is determined (at step S2).

Figure 4:
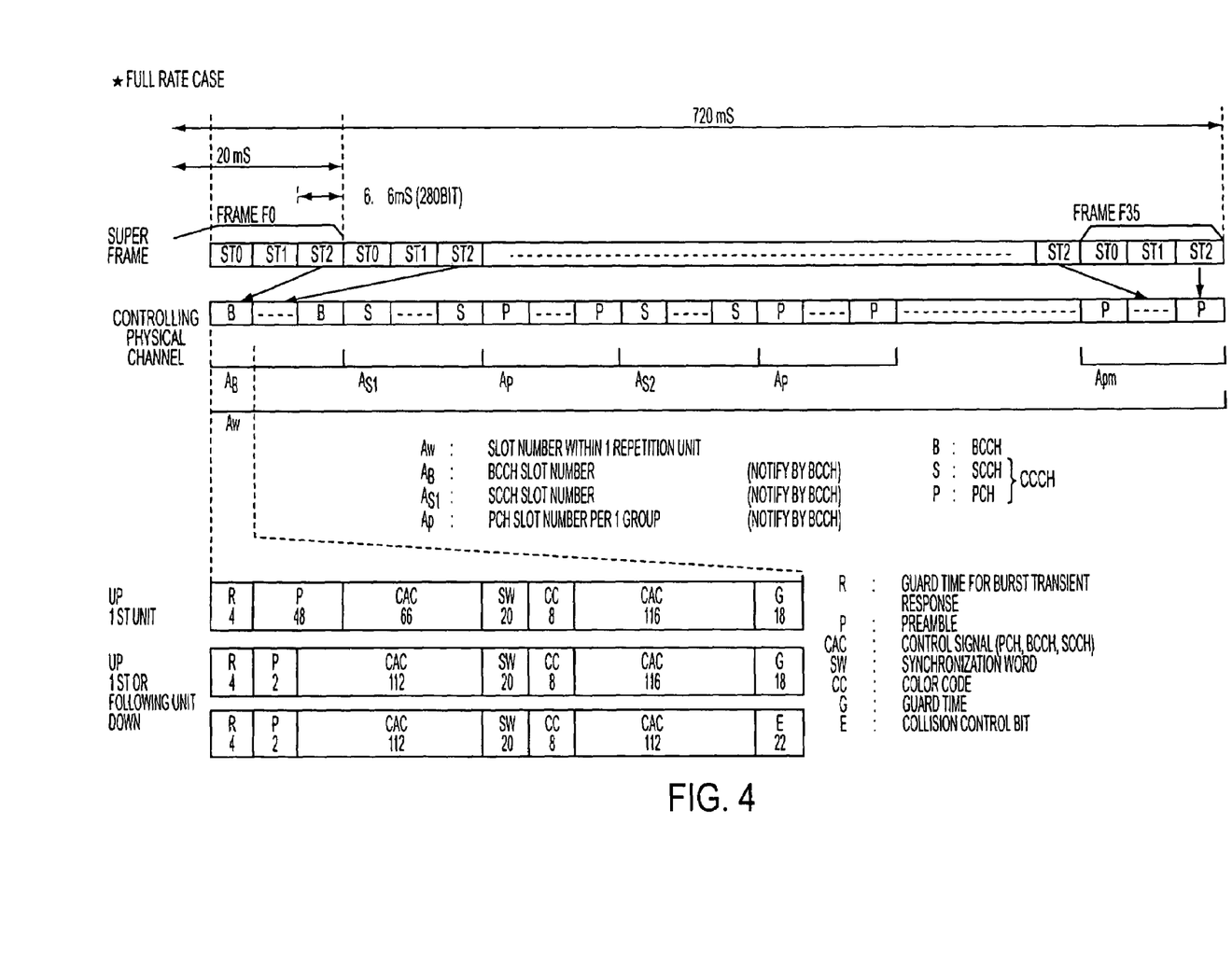
FIG. 4 is a diagram showing a frame format example between a mobile terminal and a wireless controller.

The reference numeral 2-3 denotes a wireless controller of a mobile terminal to which the mobile terminal 1 belongs. FIG. 4 shows an example of a frame format between the mobile terminal 1 and the wireless controller 2-3 in this embodiment. In case of an existing general PDC (Personal Digital Cellular) network, there are a controlling physical channel and a communicating physical channel for a wireless channel between a mobile terminal and a wireless base station.

The controlling physical channel is divided into a broadcast channel "B" (hereinafter abbreviated as BCCH (Broadcast Control CHannel)) which broadcasts the location information or the like from the network to the mobile terminal, and a common control channel (hereinafter abbreviated as CCCH (Common Control CHannel)) which performs a bidirectional communication between the mobile terminal and the network. The CCCH is further divided into a paging channel "P" (hereinafter abbreviated as PCH) used for simultaneous calling, and a signaling control channel "S" (hereinafter abbreviated as SCCH) which transfers messages such as a call demand, location information, and registration demand except the simultaneous calling.

In addition, the communicating physical channel is mainly used by users, but is not used in the present invention.

When being activated by the user access determinating portion 2-2 (at step S2) in this embodiment, the wireless controller 2-3 transmits the dummy or random location information, which is different from the location information of the area where the mobile terminal controller 2, that is the facilities offerer "B", is located, to the mobile terminal 1 (at step S3) with the BCCH. Such location information may be periodically transmitted. In this case, the user access determinating portion 2-2 is not required.

On the other hand, when the location information received from the mobile terminal controller 2 disagrees with the location information stored in the mobile terminal 1, the mobile terminal 1 has a function of transmitting a location registration demand (user information/mobile terminal information or the like) together with the SCCH. Since both location information disagrees with each other, the mobile terminal 1 which has received the above-mentioned dummy or random location information transmits the user information together with the location registration demand message (at step S5).

It is to be noted that when the user access is determined with the infrared ray or the like as mentioned above, the transmission of the dummy location information is suspended at the time of receiving the user information (at step S6). Also, when the dummy location information or the like is always transmitted without using the infrared ray or the like, the transmission of the location registration demand message is repeated. However, even though a base station (not shown) performs the location registration in response thereto, only the same location registration is repeated without any particular problem.

Figure 5:
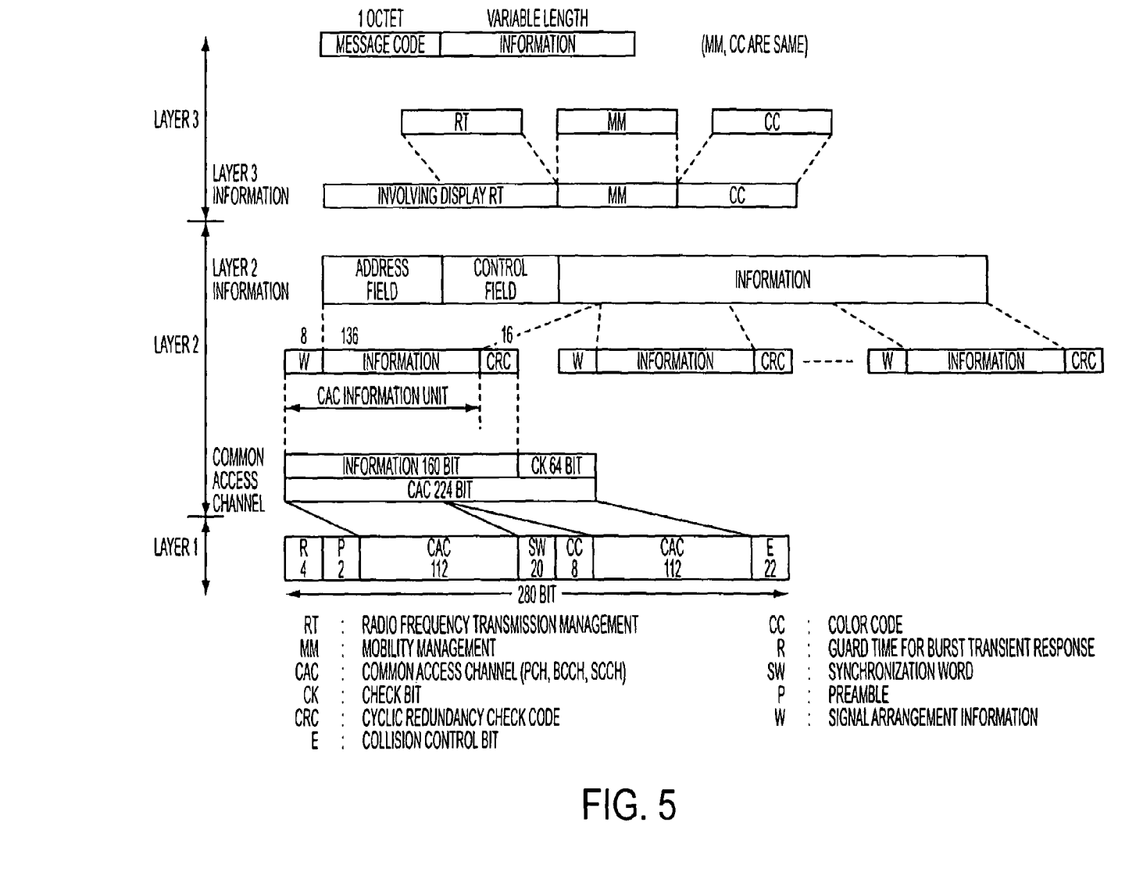
FIG. 5 is a diagram showing a layer configuration of a control message/controlling physical channel.

FIG. 5 shows a general layer configuration of a control message of the above-mentioned location registration demand message or the like, and the controlling physical channel.

The wireless controller 2-3 further receives the user information from the mobile terminal 1 with the above-mentioned controlling physical channel of BCCH/CCCH between the wireless controller 2-3 and the mobile terminal 1 through the wireless transceiver 2-1 (at step S6), transmits the same to a public network controller 2-4, and temporarily stores the user information as an address of the user information described later. It is to be noted that when the user information is acquired, an electrical transmitting/receiving function or a transmitting/receiving function using the infrared ray or the like may be provided in the mobile terminal 1 different from the controlling physical channel, so that the user information may be acquired by an interface with the wireless controller 2-3.

The public network controller 2-4 is composed of a personal computer having a modem function, an application software for controlling the public network, and the like. When receiving the above-mentioned user information, the public network controller 2-4 automatically calls, through a communication network 5 and an exchange line trunk 7, a unique number of a data transfer unit 6 in the mobile exchange "C" having the area where the facilities offerer "B" is located (at step S7).

When the call connection is completed (at step S8), a transmission/reception of data which are the user information to which an identification number of the facilities offerer "B" is assigned, is performed between the public network controller 2-4 and the data transfer unit 6 according to the data transfer protocol such as PPP protocol (at step S9). In addition, the public network controller 2-4 has a personal computer port such as USB, and is interfaced with the display/operation panel 3 for user information, accounting information, or the like, and the user information accumulator 4 of a hard disk or the like.

A user information display of the display/operation panel 3 displays (notifies) the user information, the accounting information, and the like for the facilities user "A" or the facilities offerer "B". The operation panel designates the number of the facilities user or the like when the facilities user approves the accounting. This operation panel may be operated by means of speech recognition or the like.

A password inputting method can be also used. A password can also be stored beforehand, together with the user information, in a home location register (hereinafter abbreviated as HLR) 8 in the mobile exchange "C" or "D" to which the mobile terminal owner (facilities user) "A" belongs, so that the data transfer unit 6 can compare and check a received password with the password acquired from the HLR 8, thereby preventing a wrong use of the users except the facilities user "A".

Figure 6:
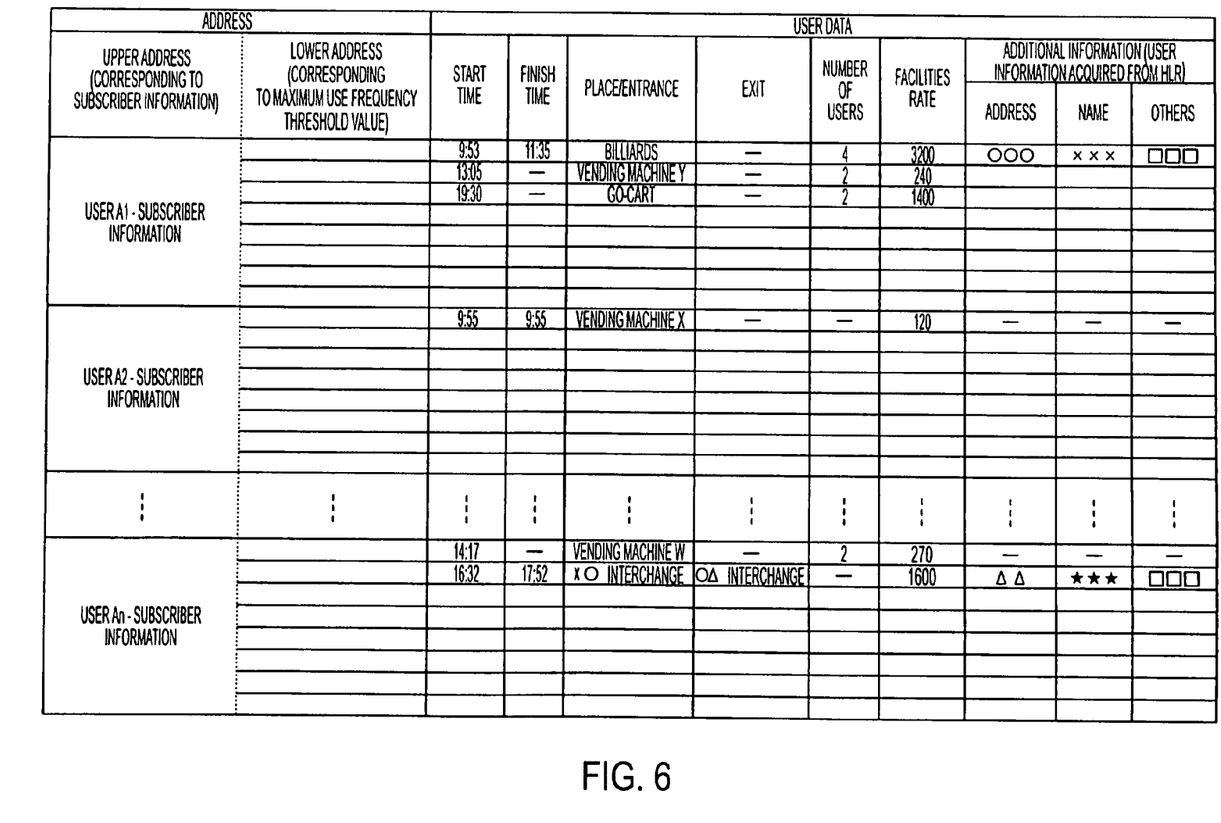
FIG. 6 is a diagram showing an arrangement of a database stored in the user information accumulator shown in FIG. 2.

The user information accumulator 4 has a database shown in FIG. 6, where a start and finish time of using facilities, place, the number of users besides the accounting information are accumulated, with the user information detected from the mobile terminal 1 being made an address, every time the accumulator 4 activates the HLR 8 to which the facilities user "A" belongs. It is to be noted that when a confirmation procedure is adopted by the display/operation panel 3 at the time of using facilities, such an arrangement may be adopted that additional information, for confirming whether or not the facilities user is the person in question, such as an address and name acquired from the HLR 8 of the mobile exchange "C" or "D" to which the facilities user "A" belongs is also accumulated beforehand and is stored in the user information accumulator 4 at the time of the additional information being approved by the facilities user "A".

Also, a use status such as use frequency and price of a payment, and the like can be retrieved under the control of the personal computer to be used for analyses or the like. Furthermore, by constructing an LAN between equipments in the facilities, the use status of the equipments can be managed at a single unit or place. Moreover, it is possible to collectively transmit/receive the accounting information or the like of the facilities user to/from the mobile exchanges through the mobile terminal controller of the host facilities.

Figure 1:
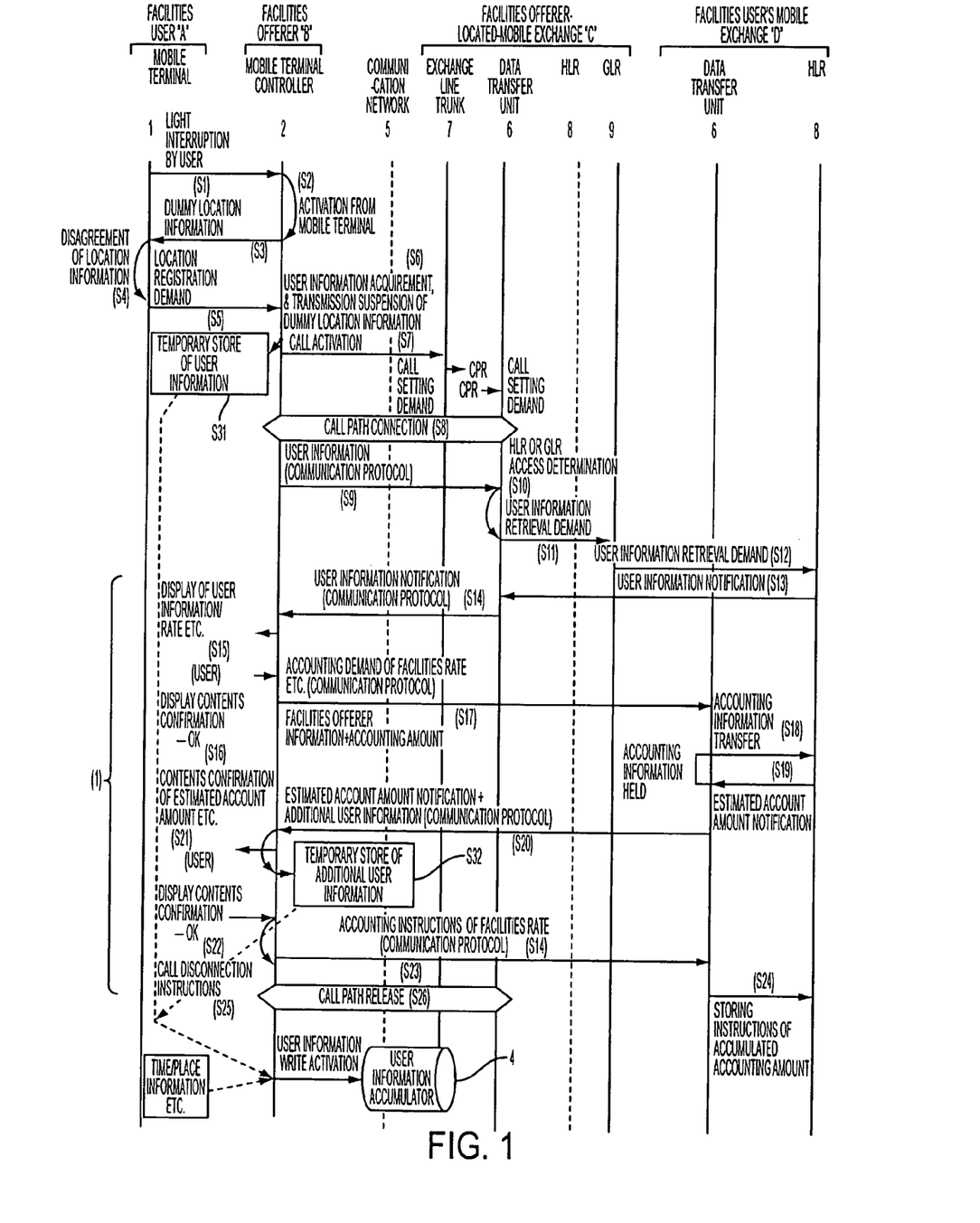
FIG. 1 is a sequence diagram illustrating a principle of a mobile communication system according to the present invention.

FIG. 1 shows one example of an access sequence to the user information accumulator 4, in which the user information is temporarily stored before the call activation (at step S7) for the mobile exchange "C" (at step S31) and after the confirmation procedure by the display/operation panel 3 (at step S32), so that it is finally stored by a write activation (at step S33).

The reference numeral 5 denotes a communication network, which is a network for a leased line owned by the public network and the mobile exchange and the like. In this embodiment, the facilities offerer "B" is connected to the exchange line trunk 7 of the mobile exchange having the area where the facilities offerer "B" is located through the public network, so that the transmission/reception of the information is performed with the PPP protocol or the like determined between the data transfer unit 6 and the facilities offerer, through the network 11 (hereinafter abbreviated as NW). The call setting or the like of the NW 11 is controlled by the call processor (CPR).

Figure 7:
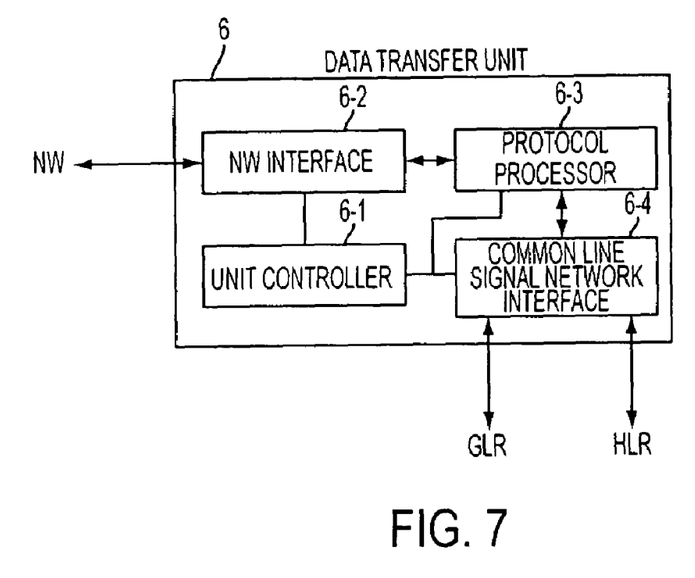
FIG. 7 is a block diagram showing an embodiment of the data transfer unit shown in FIG. 2.

FIG. 7 shows an embodiment of a data transfer unit 6, in which a reference numeral 6-1 denotes a unit controller, which communicates with a CPR 10 of the mobile exchange, and manages the control of whole of the data transfer unit 6. A reference numeral 6-2 denotes an NW interface, which is controlled by the unit controller 6-1 and selects the call connection of the facilities offerer "B". A reference numeral 6-3 denotes a protocol processor, which transmits/receives data such as user information according to the protocol determined between the public controller 2-4 within the mobile terminal controller 2 of the facilities offerer "B" and the protocol processor 6-3, performs a terminal processing, and transfers the data to a common line signal network interface 6-4.

The protocol processor 6-3 determines whether or not the mobile terminal 1 of the facilities user "A" belongs to the HLR 8 based on the extracted user information or the like (at step S10). When it belongs to the own HLR 8, it is connected to the own HLR 8 through the exchange line trunk 7. The data communication of the user information or the like extracted from the HLR 8 is performed between the mobile exchanges through the protocol processor 6-3.

Namely, when the mobile terminal 1 of the facilities user "A" does not belong to the own HLR 8, as shown in FIG. 1, the HLR 8 having the area where the mobile terminal 1, stored in a gateway location register (GLR 9) in the same way as the HLR 8, is located, is specified as the HLR 8 of the mobile exchange "D" in e.g. FIG. 2, and is connected through the GLR 9 of the mobile exchange "C" (at steps S11 and S12), so that the data communication of the user information or the like is performed across the HLR 8 of the mobile exchange "D" and the facilities offerer "B" (at steps S13 and S14).

It is to be noted that when the mobile terminal owner "A" registers the password in the HLR 8 beforehand at the time of the data communication between the facilities offerer "B" and the HLR 8, the display/operation panel 3 displays instructions of inputting password (at step S15), the password is inputted from the operation panel 3 (at step S16), and the password is checked with the password stored in the HLR 8, so that only to the coincident password the following accounting process can be shifted.

Figure 8:
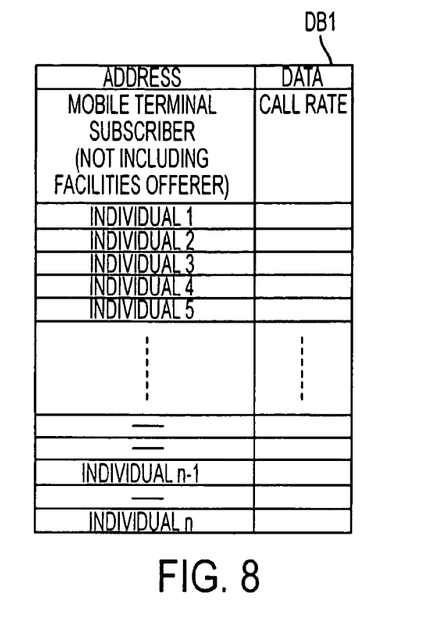
FIG. 8 is a diagram showing a database arrangement (1) of the home location register (HLR) shown in FIG. 2.
Figure 9:
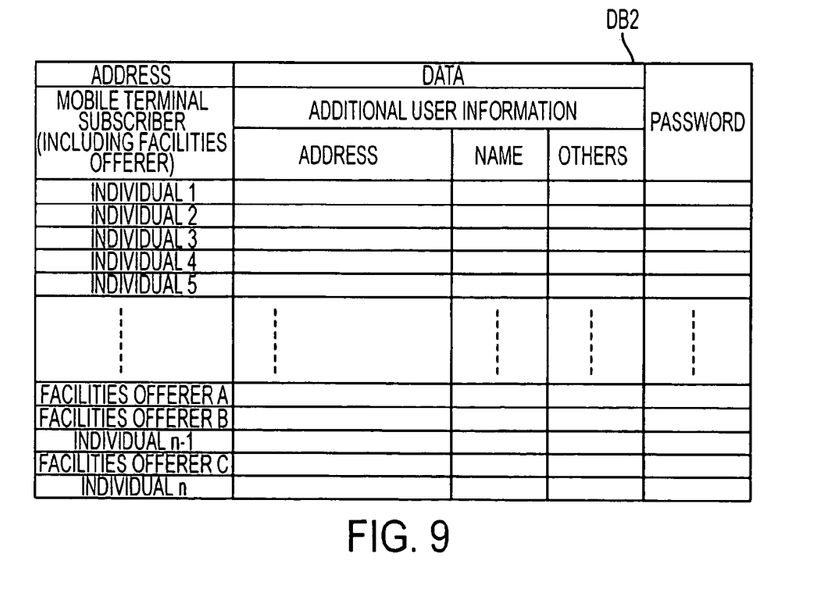
FIG. 9 is a diagram showing a database arrangement (2) of the home location register (HLR) shown in FIG. 2.
Figure 10:
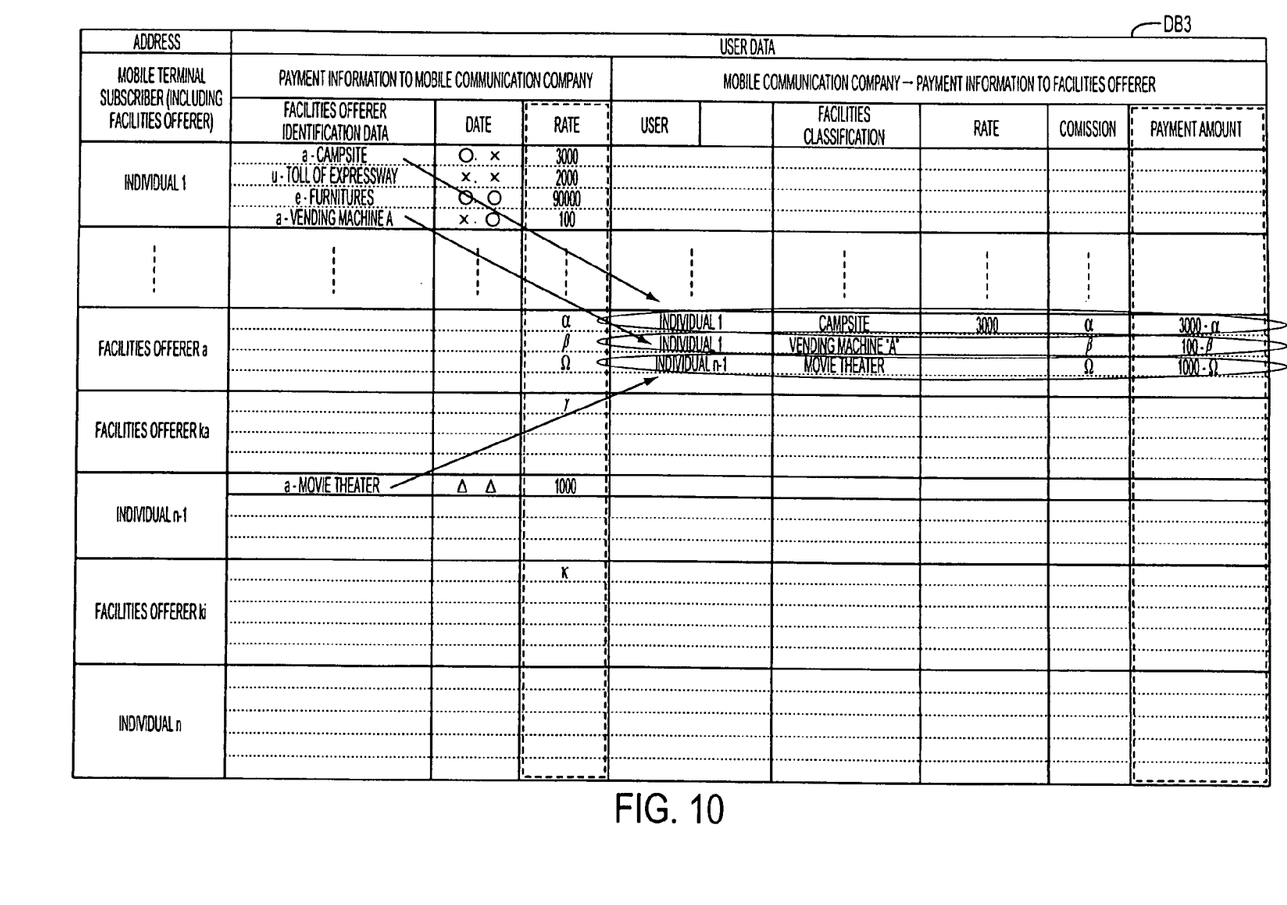
FIG. 10 is a diagram showing a database arrangement (3) of the home location register (HLR) shown in FIG. 2.

The HLR 8 has database arrangements (1)–(3) respectively shown in FIGS. 8–10. Among these, the arrangement (1) of FIG. 8 includes only a usual call rate for every mobile terminal owner. The arrangement (2) of FIG. 9 stores the additional information of not only the facilities user but also the facilities offerer "B", and also stores the password for preventing the wrong use of the users except the mobile terminal owner. Furthermore, the arrangement (3) of FIG. 10 stores mobile exchange access rate of the facilities offerer "B" and the difference rate between the facilities rate to be paid by the facilities user minus the mobile exchange access rate as an amount of money to be paid to the facilities offerer "B".

Also, the GLR 9 holds the database for managing the user information and the mobile terminal information for offering services to a mobile terminal roamed from other networks, and retrieves which mobile exchange's HLR 8 the mobile terminal subscriber belongs to, through the GLR 9 while the mobile terminal is roaming.

The mobile terminal owner "A" (or facilities offerer "B" in some case) confirms the contents of the user information, accounting amount, and the like, and makes the accounting instructions from the operation panel 3, so that accounting data are transmitted from the mobile terminal controller 2 to the HLR 8 of the mobile exchange "D" of the mobile terminal owner "A", in the same way as the above, through the data transfer unit 6 (at steps S17 and S18). The common line signal interface 6-4 within the data transfer unit 6 adds the above-mentioned accounting data such as a facilities rate to usual communication expenses stored in the HLR 8 (at step S19). The sum is again stored in the HLR 8. The accounting result is displayed on the display panel 3 (at step S20).

It is to be noted that the accounting result can be rejected by the instructions from the operation panel 3 to clear the accounting data on the HLR side. Also in this embodiment, the check of the password set in the HLR 8 with the received password, a certification demand for the facilities user "A" when the passwords are coincident with each other, and a cancel demand can be made.

It is to be noted that when the facilities user does not require the confirmation of the accounting contents, a sequence (1) shown in FIG. 1 can be omitted in the above-mentioned embodiments.

On the other hand, when the facilities rate is confirmed by the facilities user "A" (at step S22), the accounting instructions are given from the mobile terminal controller 2 to the HLR 8 through the data transfer unit 6 of the mobile exchange "D" (at steps S23 and S24). Then, a call disconnection is instructed (at step S25), so that the call path is released (at step S26).

After thus performing the accounting information process to the HLR of the mobile exchange, the mobile exchange executes the payment of the facilities rate together with the communication expenses from the account of the mobile terminal owner "A" through a financial organization as usual. The amount of the facilities rate from which the service offering rate of its own is subtracted is remitted to the account of the facilities offerer.

Figure 11:
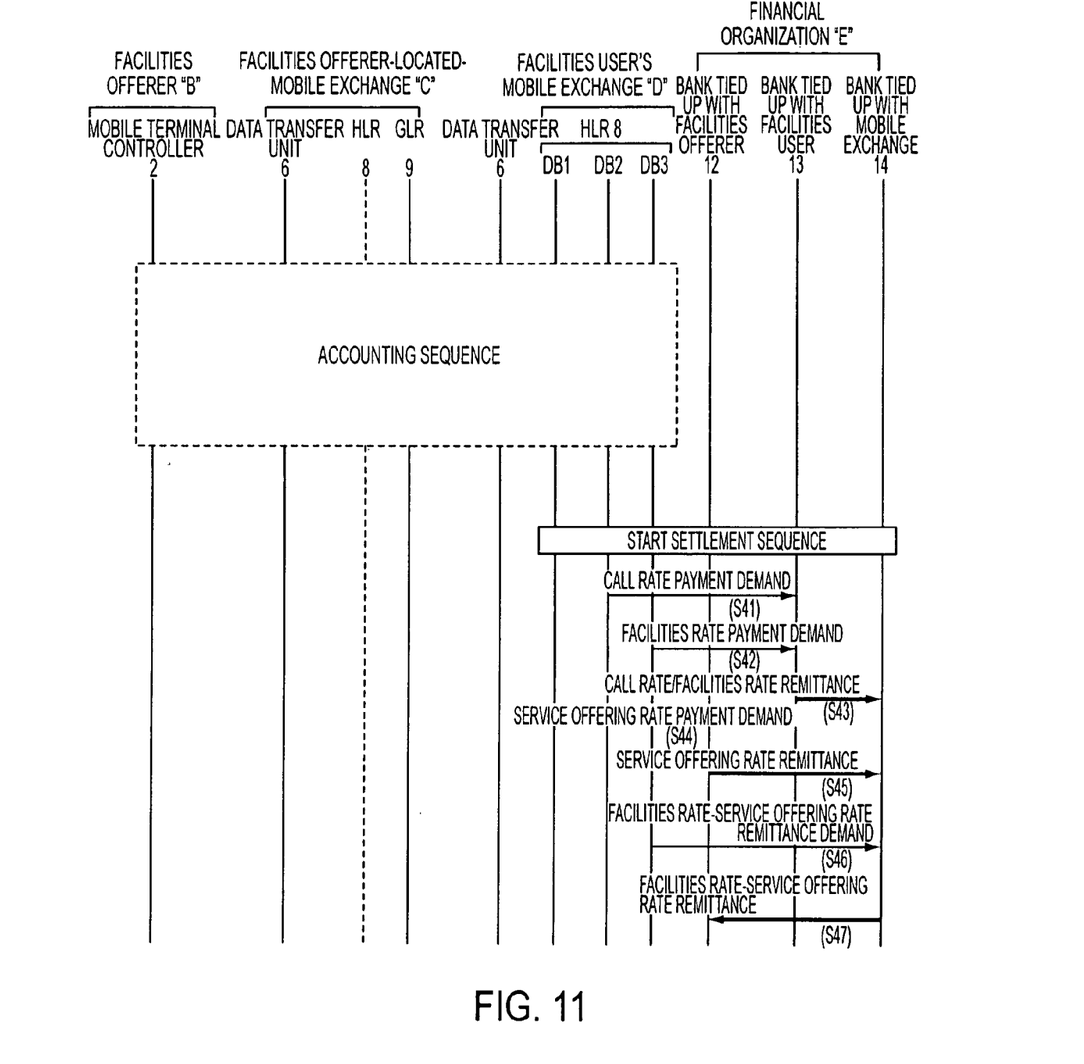
FIG. 11 is a diagram showing a sequence of an electronic settlement process after the accounting process of FIG. 1.

Namely, as shown in FIGS. 2 and 11, a financial organization "E" is composed of a bank 12 (12-1,12-2) tied up with the facilities offerer, a bank 13 (13-1,13-2) tied up with the facilities user, and a bank 14 (14-1,14-2) tied up with the mobile exchange (mobile communication company), so that the banks are connected to each other in the form of on-line.

In an electronic settlement sequence, as shown in FIG. 11, the HLR 8 of the mobile exchange "D" demands the bank 13 tied up with the facilities user to execute the payment of the call rate and the facilities rate (at steps S41 and S42). In response, the bank 13 tied up with the facilities user remits the rate to the bank 14 tied up with the exchange (at step S43). The HLR 8 further demands the payment of the service offering rate (at step S44). In response, the bank 12 tied up with the facilities offerer remits the corresponding service offering rate to the bank 14 tied up with the exchange (at step S45). Also, the HLR 8 demands the bank 14 tied up with the exchange to remit the amount of facilities rate minus service offering rate (at step S46). In response, the bank 14 tied up with the exchange remits the corresponding difference to the bank 12 tied up with the facilities offerer (at step S47).

Figure 12:
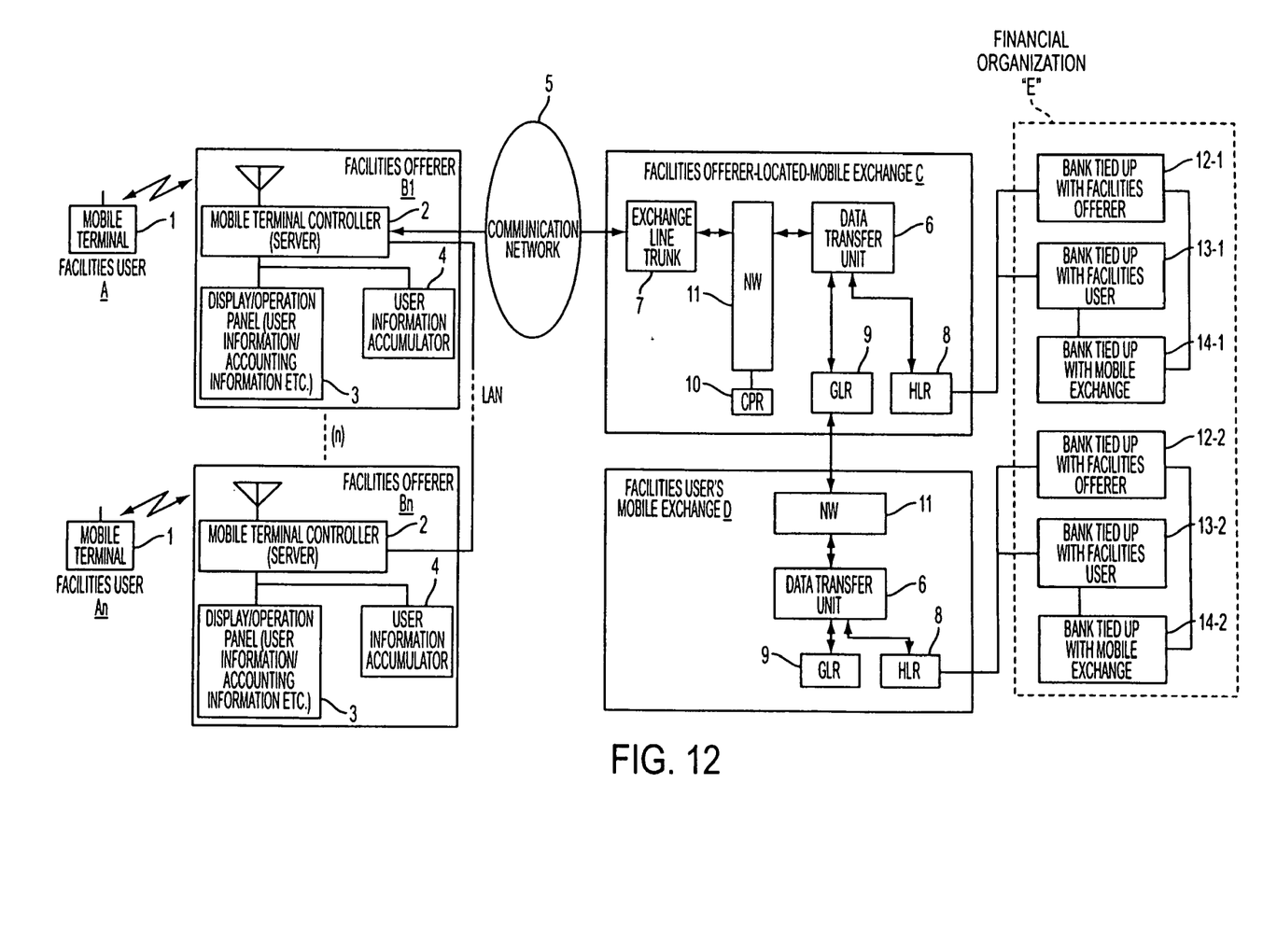
FIG. 12 is a block diagram showing an embodiment (2) of a mobile communication system according to the present invention.

FIG. 12 shows an embodiment (2) of a mobile communication system according to the present invention. This embodiment (2) is different from the embodiment (1) of FIG. 2 in that a plurality of facilities offerers B1–Bn exist.

For this reason, the mobile terminal controller 2 is composed of a personal computer, and has an LAN connecting function added between a plurality of facilities. It is arranged that the user information of the mobile terminal controllers on the client side is transmitted/received to/from the mobile exchange through the mobile terminal controller on the host side.

By adopting this arrangement, an accounting based on a distance between accounting places on the expressway or the like whose accounting information can not be obtained by a single facilities unit, and an accounting based on a time difference between the facilities (i.e. difference between an entrance time and an exit time) can be made possible. When the user enters into e.g. the facilities offerer "Bn" which becomes a client, a plurality of facilities offerers transfer the time/entrance or the like together with the acquired mobile terminal user information to the user information accumulator 4 of the host facilities offerer "B1" through the LAN.

On the other hand, e.g. the facilities offerer "Bk" (not shown) which provides leaving time/exit transfers user's exit time/entrance place or the like to the facilities offerer "B1" which becomes the host.

The facilities offerer "B1" which becomes the host calculates the amount of money to be accounted from the user's leaving time/exit based on the database (HLR 8) of the user who entered into the facilities to be notified to the mobile exchange. The transmission/reception operation of the information between the mobile exchange and the facilities offerer is the same as the above.

As described above, a mobile communication system according to the present invention is arranged such that a mobile terminal controller is provided in an offerer of pay facilities, for transmitting dummy or random location information to the mobile terminal carried by a user of the pay facilities, for connecting a call to the mobile exchange to provide the mobile exchange with user information when the mobile terminal transmits a location registration demand message with the user information in response to the location information, and for providing the mobile exchange with accounting information of a facilities rate in response to a retrieval when the mobile exchange retrieves the user information in the database. Therefore, the payment of the facilities rate such as a vending machine, movie theater, expressway, and the like by using an existing mobile terminal becomes cashless, and complicatedness in a rate payment/procedure at the time of using facilities can be canceled. Also, since no call is connected, call rate is not charged, and the mobile terminal owner is not required to perform a troublesome operation for the call connection.

Also, the facilities offerer can exclude complicatedness of a rate collection, reduction of personnel expenses, and the like by making the payment automatic. Also, by accumulating the user information accompanied by the access to the database of the mobile exchange, facilities availability status or the like can be grasped in real time, and can be utilized for a data analysis for facilities investment or the like.

Furthermore, the mobile exchange can improve earnings as a database access rate for the facilities offerer with less facilities investment, and increase the earnings by acquiring users for improved services, for the mobile terminal user.

What is claimed is:

1. A mobile communication system comprising:
a mobile terminal,
a mobile exchange having a database for holding accounting information of the mobile terminal, and
a mobile terminal controller, provided in an offerer of pay facilities, for transmitting dummy or random location information to the mobile terminal carried by a user of the pay facilities, for connecting a call to the mobile exchange to provide the mobile exchange with user information when the mobile terminal transmits a location registration demand message with the user information in response to receiving the dummy or random location information, for notifying the mobile terminal of the user information when the mobile exchange retrieves the user information in the database, and for providing the database with accounting information of a facilities rate.

2. The mobile communication system as claimed in claim 1 wherein the mobile terminal controller has means for transmitting the location information when an interruption of a light source by a user of the mobile terminal occurs and for suspending the transmission when the user information is received.

3. The mobile communication system as claimed in claim 2 wherein when notifying the mobile terminal of the user information, the mobile terminal controller has accounting confirmation means for making the facilities user or the facilities offerer confirm an accounting of the facilities rate.

4. The mobile communication system as claimed in claim 3 wherein the accounting confirmation means have display means of the user information and the facilities rate, and confirmation means that the facilities user or the facilities offerer confirms display contents by the display means.

5. The mobile communication system as claimed in claim 4 wherein the confirmation means include password inputting means and means for comparing and checking the password with a password included in the database.

6. The mobile communication system as claimed in claim 2 wherein the mobile terminal controller is provided in each of a plurality of facilities offerers, and a single mobile terminal controller is made a host and the other mobile terminal controllers are made clients, whereby various kinds of information from each client mobile terminal controller is transmitted to the host mobile terminal controller to generate the accounting information, which is transferred through the host mobile terminal controller.

7. The mobile communication system as claimed in claim 2 wherein the mobile terminal controller has a database for accumulating the information every time the information is transferred to the database of the mobile exchange.

8. The mobile communication system as claimed in claim 1 wherein the location information is always transmitted.

9. The mobile communication system as claimed in claim 1 wherein the mobile exchange has means for storing which mobile exchange's database holds which user information, and means for retrieving a database of another mobile exchange which holds the user information from the storing means to demand the other mobile exchange to retrieve the user information when the mobile exchange can not retrieve the user information from its database.

10. The mobile communication system as claimed in claim 9 wherein the database comprises a home location register, and the storing means comprise a gateway location register.

11. The mobile communication system as claimed in claim 1 wherein the database of the mobile exchange has, as the accounting information, the facilities rate with respect to the facilities user and the facilities rate from which service offering rate to a mobile exchange having an area where the mobile terminal controller is located is subtracted.

12. A mobile terminal controller, provided in an offerer of pay facilities, comprising:
- means for transmitting dummy or random location information to a mobile terminal carried by a user of the pay facilities;
- means for connecting a call to a mobile exchange having a database for holding accounting information of the mobile terminal to provide the mobile exchange with user information when the mobile terminal transmits a location registration demand message with the user information in response to receiving the dummy or random location information;
- means for notifying the mobile terminal of the user information when the mobile exchange retrieves the user information in the database; and
- means for providing the database with accounting information of a facilities rate.

13. The mobile terminal controller as claimed in claim 12, further comprising means for transmitting the location information when an interruption of a light source by a user of the mobile terminal occurs and for suspending the transmission when the user information is received.

14. The mobile terminal controller as claimed in claim 13, further comprising accounting confirmation means for making the facilities user or the facilities offerer confirm an accounting of the facilities rate when notifying the mobile terminal of the user information.

15. The mobile terminal controller as claimed in claim 14 wherein the accounting confirmation means have display means of the user information and the facilities rate, and confirmation means that the facilities user or the facilities offerer confirms display contents by the display means.

16. The mobile terminal controller as claimed in claim 15 wherein the confirmation means include password inputting means and means for comparing and checking the password with a password included in the database.

17. The mobile terminal controller as claimed in claim 13, further comprising a database for accumulating the information every time the information is transferred to the database of the mobile exchange.

* * * * *